United States Patent
Awada et al.

(10) Patent No.: US 12,356,256 B2
(45) Date of Patent: Jul. 8, 2025

(54) USER EQUIPMENT BEAM REFINEMENT BEFORE COMPLETION OF HANDOVER

(71) Applicant: Nokia Technologies Oy, Espoo (FI)

(72) Inventors: Ahmad Awada, Munich (DE); Christian Rom, Aalborg (DK); Samantha Caporal Del Barrio, Aalborg (DK); Ingo Viering, Munich (DE); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/232,053

(22) Filed: Apr. 15, 2021

(65) Prior Publication Data

US 2022/0338073 A1  Oct. 20, 2022

(51) Int. Cl.
*H04W 36/00* (2009.01)
*H04B 7/06* (2006.01)
(Continued)

(52) U.S. Cl.
CPC ...... *H04W 36/0058* (2018.08); *H04B 7/0626* (2013.01); *H04L 5/0048* (2013.01);
(Continued)

(58) Field of Classification Search
CPC ....... H04W 36/0058; H04W 36/00837; H04W 72/042; H04W 80/02; H04B 7/0626; H04L 5/0048
See application file for complete search history.

(56) References Cited

U.S. PATENT DOCUMENTS

2018/0041319 A1* 2/2018 Cheng ................. H04B 7/0695
2018/0227031 A1* 8/2018 Guo .................... H04B 7/0626
(Continued)

FOREIGN PATENT DOCUMENTS

| WO | 2018/174782 A1 | 9/2018 |
| WO | 2018/231655 A1 | 12/2018 |
| WO | 2019/110869 A1 | 6/2019 |

OTHER PUBLICATIONS

International Search Report and Written Opinion received for corresponding Patent Cooperation Treaty Application No. PCT/EP2022/057930, dated Jul. 7, 2022, 14 pages.
(Continued)

*Primary Examiner* — Christine Ng
(74) *Attorney, Agent, or Firm* — Brake Hughes Bellermann LLP

(57) ABSTRACT

Improved techniques of beam management in a HO situation include receiving, at a source node from a candidate target node after receiving a measurement report from a UE prior to completion of a HO, a repetition configuration of a channel state information reference signal (CSI-RS) resource index to be used by the UE for random access. When beam refinement occurs during HO, a candidate target cell for HO provides the UE with a repetition configuration of CSI-RS resource index that will be selected and used by the UE for random access to the target cell. When beam refinement occurs before HO, the candidate target cell of handover provides the UE (e.g. during the handover preparation phase in case of conditional HO (CHO)) with the repetition configuration of CSI-RS resource index (or indices) whose transmission(s) is repeated while the UE is served by the source cell and before executing a handover.

24 Claims, 8 Drawing Sheets

(51) Int. Cl.
  *H04L 5/00* (2006.01)
  *H04W 72/23* (2023.01)
  *H04W 80/02* (2009.01)
(52) U.S. Cl.
  CPC .  *H04W 36/0072* (2013.01); *H04W 36/00837* (2018.08); *H04W 72/23* (2023.01); *H04W 80/02* (2013.01); *H04W 36/00725* (2023.05)

(56) References Cited

U.S. PATENT DOCUMENTS

| | | | |
|---|---|---|---|
| 2018/0343595 A1 | 11/2018 | da Silva et al. | |
| 2019/0356439 A1* | 11/2019 | Lee | H04W 74/0833 |
| 2020/0053607 A1* | 2/2020 | Ingale | H04W 36/0058 |
| 2020/0068463 A1* | 2/2020 | Da Silva | H04W 16/28 |
| 2020/0252997 A1* | 8/2020 | Sirotkin | H04W 88/10 |
| 2020/0275287 A1* | 8/2020 | Kumagai | H04B 7/0626 |
| 2020/0296625 A1* | 9/2020 | Pettersson | H04W 36/22 |
| 2020/0314721 A1 | 10/2020 | Cheng et al. | |
| 2021/0250989 A1* | 8/2021 | Chin | H04W 28/0278 |
| 2021/0266971 A1* | 8/2021 | Turtinen | H04W 74/0833 |
| 2021/0359800 A1* | 11/2021 | Levitsky | H04L 5/0007 |
| 2021/0385867 A1* | 12/2021 | Futaki | H04W 74/0833 |
| 2022/0038935 A1* | 2/2022 | Xiong | H04L 1/08 |
| 2022/0104097 A1* | 3/2022 | Hu | H04W 36/30 |
| 2022/0210839 A1* | 6/2022 | Rune | H04W 36/0077 |
| 2023/0319840 A1* | 10/2023 | Zhang | H04W 72/231 370/329 |

OTHER PUBLICATIONS

"Measurement reporting and beam refinement during handover", 3GPP TSG-RAN WG2 Meeting #98, R2-1705095, Agenda : 10.2.9, Qualcomm Incorporated, May 15-19, 2017, pp. 1-4.

"Triggering of Conditional Handover in NR", 3GPP TSG RAN WG2 #105, R2-1900405, Agenda : 11.9.3, Ericsson, Feb. 5-Mar. 1, 2019, 6 pages.

"3rd Generation Partnership Project;Technical Specification Group Radio Access Network; NR;Radio Resource Control (RRC) protocol specification(Release 16)", 3GPP TS 38.331, V16.2.0, Sep. 2020, pp. 1-921.

"3rd Generation Partnership Project;Technical Specification Group Radio Access Network; NR;Medium Access Control (MAC) protocol specification(Release 16)", 3GPP TS 38.321, V16.2.1, Sep. 2020, pp. 1-154.

"3rd Generation Partnership Project;Technical Specification Group Radio Access Network;NR; NR and NG-RAN Overall Description; Stage 2 (Release 16)", 3GPP TS 38.300, V16.3.0, Sep. 2020, pp. 1-148.

"3rd Generation Partnership Project;Technical Specification Group Radio Access Network; NR;Physical layer procedures for data(Release 16)", 3GPP TS 38.214, V16.3.0, Sep. 2020, pp. 1-166.

"Handover Command and CSI-RS Configuration of Target", 3GPP TSG-RAN WG2 #97bis, Tdoc R2-1702673, Agenda : 10.2.3.2, Ericsson, Apr. 3-7, 2017, pp. 1-5.

* cited by examiner

USER EQUIPMENT BEAM REFINEMENT BEFORE COMPLETION OF HANDOVER

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, to a source node, a measurement report indicating a candidate target cell for a handover (HO) of a wireless connection within a wireless network; and receiving, from the source node, a configuration message, the configuration message including a repetition configuration of a channel state information reference signal (CSI-RS) resource index to be used for random access, the repetition configuration of the CSI-RS resource index being generated by the candidate target cell in response to a message from the source node sent in response to receiving the measurement report.

According to an example implementation, an apparatus includes at least one processor and at least one memory including computer program code, the at least one memory and the computer program code configured to, with the at least one processor, cause the apparatus at least to transmit, to a source node, a measurement report indicating a candidate target cell for a handover (HO) of a wireless connection within a wireless network; and receive, from the source node, a configuration message, the configuration message including a repetition configuration of a channel state information reference signal (CSI-RS) resource index to be used for random access, the repetition configuration of the CSI-RS resource index being generated by the candidate target cell in response to a message from the source node sent in response to receiving the measurement report.

According to an example implementation, an apparatus includes means for transmitting, to a source node, a measurement report indicating a candidate target cell for a handover (HO) of a wireless connection within a wireless network; and means for receiving, from the source node, a configuration message, the configuration message including a repetition configuration of a channel state information reference signal (CSI-RS) resource index to be used for random access, the repetition configuration of the CSI-RS resource index being generated by the candidate target cell in response to a message from the source node sent in response to receiving the measurement report.

According to an example implementation, a computer program product includes a computer-readable storage medium and storing executable code that, when executed by at least one data processing apparatus, is configured to cause the at least one data processing apparatus to transmit, to a source node, a measurement report indicating a candidate target cell for a handover (HO) of a wireless connection within a wireless network; and receive, from the source node, a configuration message, the configuration message including a repetition configuration of a channel state information reference signal (CSI-RS) resource index to be used for random access, the repetition configuration of the CSI-RS resource index being generated by the candidate target cell in response to a message from the source node sent in response to receiving the measurement report.

According to an example implementation, a method includes receiving, from a user equipment (UE), a measurement report indicating a candidate target cell for a handover (HO) of a wireless connection within a wireless network; after receiving the measurement report, sending a message to the candidate target node; and receiving, from the candidate target node, a response to the message, the response including a repetition configuration of a channel state information reference signal (CSI-RS) resource index to be used by the UE for random access.

According to an example implementation, an apparatus includes at least one processor and at least one memory including computer program code, the at least one memory and the computer program code configured to, with the at least one processor, cause the apparatus at least to receive, from a user equipment (UE), a measurement report indicating a candidate target cell for a handover (HO) of a wireless connection within a wireless network; after receiving the measurement report, send a message to the candidate target node; and receive, from the candidate target node, a response to the message, the response including a repetition configuration of at least one channel state information reference signal (CSI-RS) resource index to be used by the UE for random access.

According to an example implementation, an apparatus includes means for receiving, from a user equipment (UE), a measurement report indicating a candidate target cell for a handover (HO) of a wireless connection within a wireless network; means for, after receiving the measurement report, send a message to the candidate target node; and means for receiving, from the candidate target node, a response to the message, the response including a repetition configuration of at least one channel state information reference signal (CSI-RS) resource index to be used by the UE for random access.

According to an example implementation, a computer program product includes a computer-readable storage medium and storing executable code that, when executed by at least one data processing apparatus, is configured to cause the at least one data processing apparatus to receive, from a user equipment (UE), a measurement report indicating a candidate target cell for a handover (HO) of a wireless connection within a wireless network; after receiving the measurement report, send a message to the candidate target node; and receive, from the candidate target node, a response to the message, the response including a repetition configuration of at least one channel state information reference signal (CSI-RS) resource index to be used by the UE for random access.

The details of one or more examples of implementations are set forth in the accompanying drawings and the description below. Other features will be apparent from the description and drawings, and from the claims.

DETAILED DESCRIPTION

Figure 1:
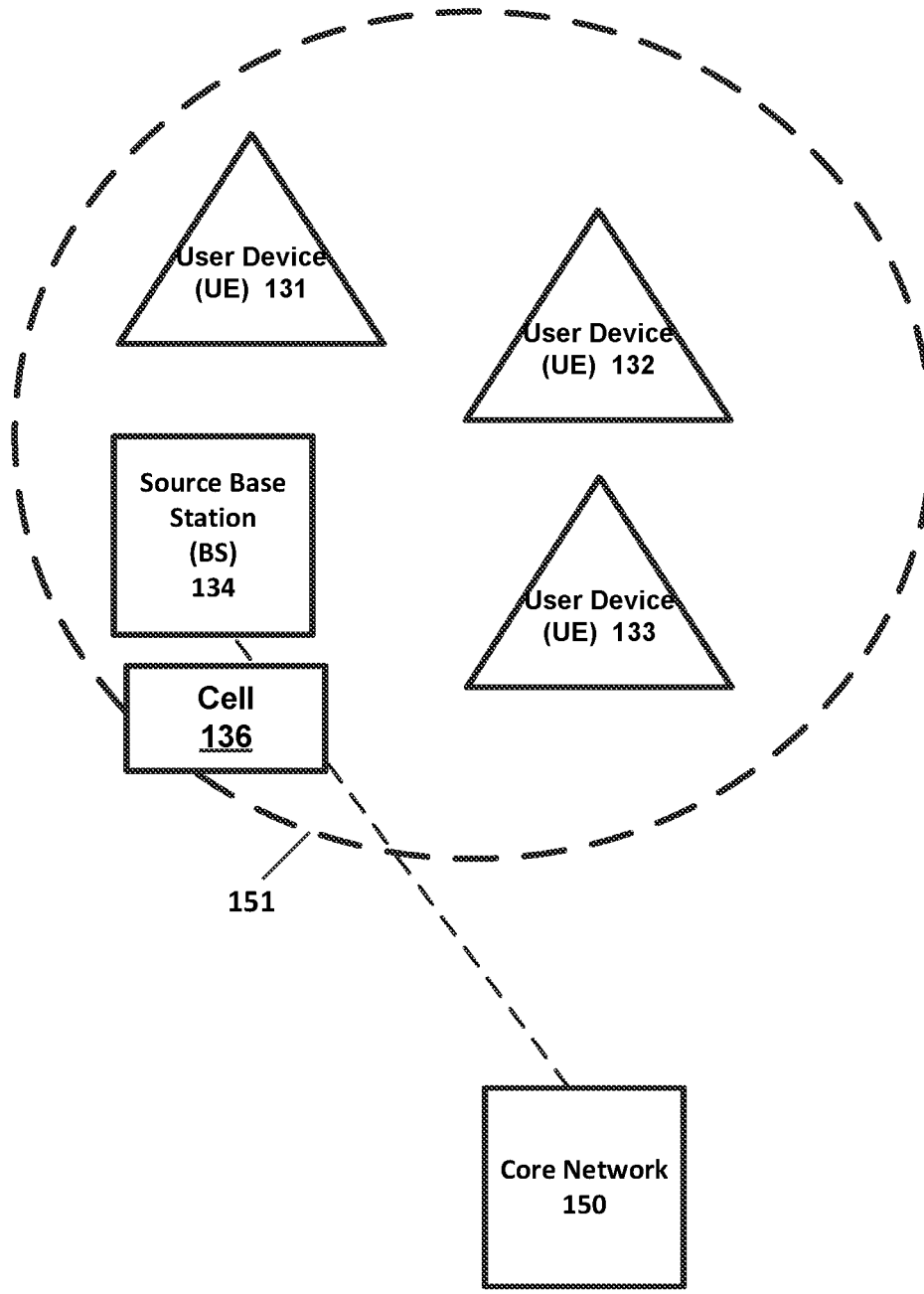
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) also may be carried out by any node, server or host which may be operably coupled to a transceiver, such as a remote radio head. BS (or AP) 134 provides wireless coverage within a cell 136, including to user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Handover (HO) procedures are used in 5G NR to maintain robustness of connection between a user equipment (UE) and a wireless network over different cells. To effect HO, a UE sends measurement reports to a source node (source gNB) indicating measurement values for serving and neighboring cells such as reference signal received power (RSRP). The measurement report is typically sent in an event-triggered manner when the measurement values meet certain criteria (e.g., the RSRP of neighboring cell becomes better than the measurement of the serving cell by some offset for some Time-to-Trigger (TTT). Upon receiving the measurement report, the source gNB identifies a target node (a target gNB) to which the source gNB sends a HO request. The target gNB may acknowledge the HO request by sending an acknowledgement message to the source gNB. In response, the source gNB then sends a radio resource control (RRC) reconfiguration message to the UE, indicating a HO to the target gNB; at this point, data exchange between the UE and the source gNB terminates and the source gNB forwards data intended for the UE to the target gNB. The UE then initiates communication with the target gNB. For example, the UE sends a physical random access channel (PRACH) preamble to the target gNB. In response, the target gNB sends the UE a random access response (RAR), and the UE sends to the target gNB a message indicating that the RRC reconfiguration is complete. The target gNB sends the forwarded data to the UE and the connection between the UE and target gNB is established.

Alternatively, conditional HO (CHO) has been introduced to reduce radio link and HO failures. In CHO, a configured event triggers the UE to send a measurement report. Based on this report, the source gNB can prepare one or more target cells for the handover (CHO Request+CHO Request Acknowledge) and then sends an RRC Reconfiguration (including handover command) to the UE. In the baseline HO described above, the UE will immediately access the target cell to complete the handover. In contrast, for CHO, the UE will only access the target cell once an additional CHO execution condition is met (i.e. the handover preparation and execution phases are decoupled). The condition is configured, e.g. by the source node in RRC Reconfiguration. As a result, CHO provides mobility robustness, but it does not reduce the interruption time associated with HO.

Reducing the interruption time associated with HO is addressed in dual-active protocol stack (DAPS) HO. Herein, each of the source and target cell has full L2 protocol stack with own security key for ciphering and deciphering of the packet data convergence protocol (PDCP) service data units (SDUs). To avoid a hard handover causing service interruption, the UE establishes a new radio link with respect to the target cell before detaching the radio link of the source cell. That is, for some time before releasing the source cell, the UE would be exchanging data with both source and target nodes.

In NR handover procedures, the UE has to perform random access to the target cell. Two types of random access (RA) procedure are supported: 4-step RA and 2-step RA with MsgA, combining Msg1 (PRACH preamble) and Msg3 (payload/data such as RRC Reconfiguration Complete message), and MsgB combining Msg2 (RAR) and Msg4 (medium access control (MAC) control element (CE) for contention resolution). Both types of RA support contention-based random access (CBRA) or contention-free random access (CFRA).

Part of establishing the connection between the UE and target gNB, however, lies in downlink (DL) beam management for optimal receive power at the UE. An example beam management procedure takes place in three phases.

The first phase (P1) is used for initial Transmission and Reception Point (TRP) beam selection and UE panel selection, i.e., a gNB controls one or more cells and the radio communication of a cell is provided by one or more TRPs. Herein, a cell sweeps periodically the transmission of synchronization signal blocks (SSBs) and UE measures the signal strength/quality of these SSBs per panel. Using the measurements, the UE selects an SSBn (typically the strongest). For PRACH transmission described above, the UE selects a preamble and RACH occasion that is associated with the selected SSBn (CBRA in initial access and CFRA in handover). By receiving the PRACH preamble on a RACH occasion that is associated with the selected SSBn, the cell determines the serving beam for the UE.

The second phase (P2) is used to enable the refinement of the TRP serving beam. Herein, the cell sweeps a set of channel state information reference signals (CSI-RSs) that are spatially co-located with the SSBn selected in P1. UE measures the signal strength/quality of CSI-RSs and indicates e.g. CSI-RS 3 with strongest measurement to the cell. Using the feedback from the UE, the serving cell determines the refined serving beam.

The third phase P3 is used for refining the UE receive beam where UE is provided possibility to sweep different receive beams for receiving a certain transmit beam. Indeed, the UE relies on the reference signals associated with nonzero power CSI-RS ResourceSet (NZP-CSI-RS-ResourceSet) configured with the higher layer parameter repetition set to 'ON' from the gNB in order to perform its receive beam alignment. The scheduling of such reference signals is fully controlled by the gNB. Herein, the serving cell configures the UE by means of RRC signalling the repetition of selected e.g. CSI-RS 3 in P2 and triggers the UE to perform measurements by means of lower layer signalling (MAC CE for semi-persistent CSI-RS or DCI for aperiodic CSI-RS). Herein, the serving cell will repeat the transmission of CSI-RS 3 while the UE is sweeping its receive beam. Once the receive beam sweep is completed, the UE may adjust its receive beam to a better one by selecting the one leading to the highest received signal strength or quality. As such, the UE waits for the gNB to schedule P3 reference signals in order to align its receive beam. The refined beam used for reception may be applied by the UE for transmitting to the serving cell. Thus, in P3, the serving cell indicates to the UE the index of CSI-RS whose transmission will be repeated.

Conventional approaches to beam management in a HO situation is to perform the beam refinement phase P3 of the above-described beam management processes after HO has been completed.

The above-described conventional approaches to beam management in a HO situation suffers from excessive delays due to the time needed to process the various messages needed during beam refinement. For example, in addition to the signaling needed for HO, the UE beam refinement procedure P3 requires three messages: a) two RRC messages and b) one lower layer message for indicating the activation of CSI-RS repetition to the UE. Moreover, the UE beam refinement procedure may take 15-20 ms to be completed after performing the handover:

Decoding of RRC Reconfiguration can be up to 10 ms;
Sending of RRC Reconfiguration complete can take 2-3 ms;
CSI-RS repetition can start 24 slots (=4 ms if slot=0.125 ms for 120 kHz subcarrier spacing) after the slot containing the DCI;
The repetition of CSI-RS transmission can be performed in one slot ~0.125 ms.

In contrast to the above-described conventional approaches to beam management in a HO situation, improved techniques of beam management in a HO situation include receiving, at a source node from a candidate target node and after receiving a measurement report from a UE prior to completion of a HO, a repetition configuration of a channel state information reference signal (CSI-RS) resource index to be used by the UE for random access. When beam refinement occurs during HO, during the HO preparation phase, a candidate target cell for HO provides the UE with a repetition configuration of CSI-RS resource index that will be selected and used by the UE for random access to the target cell. In some implementations, a trigger to activate this repetition is a target cell transmission and/or UE reception of a message indicating the successful completion of random access in a handover. When beam refinement occurs before HO, the candidate target cell of handover provides the UE (e.g. during the handover preparation phase in case of conditional HO (CHO)) with the repetition configuration of CSI-RS resource index (or indices) whose transmission(s) is repeated while the UE is served by the source cell and before executing a handover. In some implementations, a trigger to activate this repetition is either 1) downlink control information (DCI) sent to the UE by source cell and forwarded from target cell over Xn or 2) the occurrence of a pre-configured radio/and subframe number.

Advantageously, preparing in advance P3 UE beam alignment before or during the random access (using CSI-RS) is performed to the target cell such that the UE can both speed up alignment procedure and benefit from using narrow beams already during handover execution, i.e. to achieve higher beamforming gain and less interference while performing the random access which would enhance the mobility performance. Specifically, when beam refinement is performed during HO, UE beam refinement is integrated into the handover procedure which reduces the signalling overhead by three messages and time to set up the UE narrow beam by 15-20 ms; and the UE can benefit earlier from the advantages brought by the narrow beam: higher throughput by avoiding link budget drop during alignment phases and more robustness to both uplink (UL) and DL radio links thanks to higher UL EIRP and DL spatial filtering. The latter is especially relevant for cell edge UEs during handover procedures.

Performing beam refinement before HO speeds up significantly the setup of UE narrow beam and enables RACH preamble transmission/RACH response reception with UE refined beam on target cell. This is a clear benefit as it will directly enhance link budget of cell edge UEs performing handover.

Figure 2:
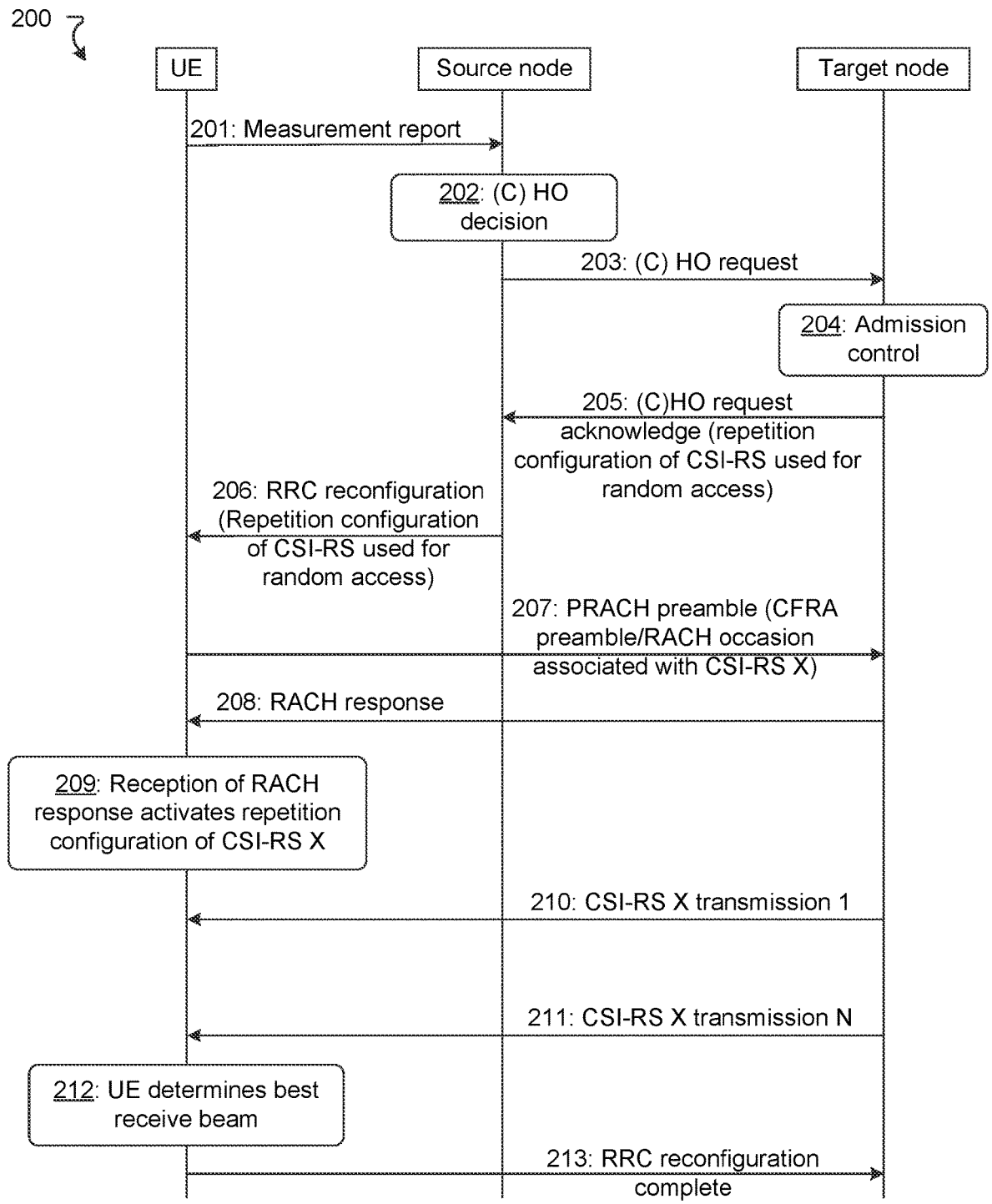
FIG. 2 is a sequence diagram illustrating a process of beam refinement during a handover or conditional handover, according to an example implementation.

FIG. 2 is a sequence diagram illustrating an example process 200 of beam refinement during a handover or conditional handover. This example implementation is directed to 4-step CFRA using CSI-RS.

At 201, a UE sends a measurement report to a source node of a wireless network. The measurement report indicates a candidate target cell for a handover (HO) of a wireless connection within a wireless network.

At 202, based on the measurement report, the source node decides to perform a HO or a conditional HO (CHO) to another cell.

At 203, the source node sends a HO or CHO request to a candidate target node.

At 204, the target cell performs an admission control and decides to accept the (C)HO.

At 205, the target cell sends a (C)HO request acknowledge message to the source node. The (C)HO request acknowledge message includes a repetition configuration of the CSI-RS resource index that will be selected and used by the UE for random access. In some implementations, the (C)HO request acknowledge message also includes an indication to the UE that the transmission of selected CSI-RS resource index that is used in random access will be repeated; this can be implemented by using a flag/Boolean for enabling/or disabling the feature. In some implementations, the (C)HO request acknowledge message also includes an indication to the UE that the trigger and activation for this repetition is the target cell transmission/or UE reception of a message indicating the successful completion of random access:

a. the message is RACH response in case of 4-step CFRA;
b. the message is MsgB in case of 2-step random access;
c. the message is PDCCH addressed by C-RNTI scheduling PDSCH containing UE contention resolution identity MAC CE in case of 4-step CBRA or RACH-less.

In some implementations, the (C)HO request acknowledge message also includes a repetition configuration of the CSI-RS resource index that will be selected and used by the UE for random access. The repetition configuration may define the following:

a. a type of transmission: Semi-persistent or aperiodic transmission;
b. a number of repetitions;
c. time/frequency information about CSI-RS allocation, i.e., slot/PRBs where to find the resource elements of CSI-RS resource; or
d. offset between the slot containing the DCI that triggers a set of aperiodic/semi-persistent CSI-RS resource and the slot in which the CSI-RS resource set is actually transmitted.

At 206, the source node sends a RRC reconfiguration message to the UE; this message includes the repetition configuration of the CSI-RS resource index that will be selected and used by the UE for random access.

At 207, the UE selects CSI-RS X and sends a CFRA PRACH preamble on a RACH occasion that is associated with CSI-RS X. In some implementations, for 4-step CFRA, the reception of RACH response activates the repetition configuration of the selected CSI-RS X. In some implementations, for 2-step random access, the reception of MsgB activates the repetition configuration of the selected CSI-RS X. In some implementations, for 4-step CBRA and/or RACH-less, the reception of PDCCH addressed by C-RNTI scheduling PDSCH containing UE contention resolution identity MAC CE activates the repetition configuration of the selected CSI-RS X.

At 208, the target node sends a RACH response to the UE.

At 209, the reception of the RACH response activates the repetition configuration of the selected CSI-RS X.

At 210 and 211, the target cell repeats the transmission of CSI-RS X that is selected by the UE for random access while the UE sweeps the receive beam.

At 212, the UE determines the best receive/transmit beam.

At 213, the UE sends the target cell a message indicating that the RRC reconfiguration is complete. Note that the signaling of RRC Reconfiguration Complete message should not be necessarily delayed by the UE receive beam sweep (e.g., it can be done in parallel). Nevertheless, as the CSI-RS sweep takes only one slot of 0.125 ms, the sweep is expected to be completed before RRC Reconfiguration Complete message is sent.

In some implementations, in which there is a split central unit (CU)/distributed unit (DU) architecture, the CU may communicate with the DU the repetition configuration of the CSI-RS resource index that will be selected and used by the UE for random access. In some implementations, the HO procedure can be a baseline handover procedure of NR Rel. 15, CHO, dual-active protocol stack (DAPS), make-before break solution similar to LTE Rel. 14, RACH-less handover, or any combination of these handover techniques.

Figure 3:
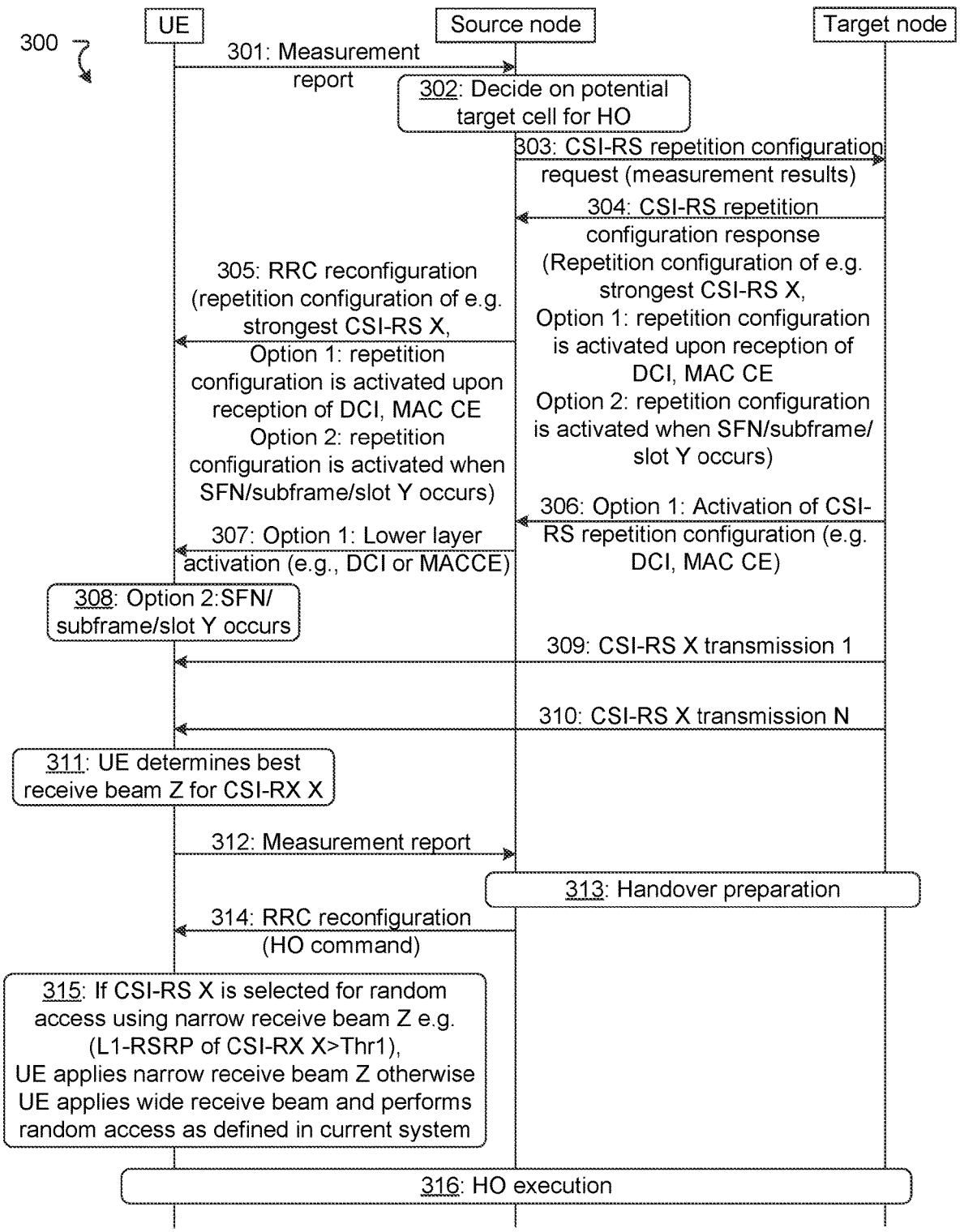
FIG. 3 is a sequence diagram illustrating a process of beam refinement before handover, according to an example implementation.

FIG. 3 is a sequence diagram illustrating an example process 300 of beam refinement before a baseline HO.

At 301, a UE sends a measurement report to a source node of a wireless network. The measurement report indicates a candidate target cell for a handover (HO) of a wireless connection within a wireless network.

At 302, based on the measurement report, the source node decides on another candidate target cell for handover.

At 303, the source node sends to the target node in step 3 a request to provide a CSI-RS repetition configuration along with the measurement results received from the UE.

At 304, as a response for the request, the target node sends the CSI-RS repetition configuration to the source cell for the CSI-RS resource index ("index X") that the UE most likely would use for random access during the handover. In some implementations, the CSI-RS index X is the strongest CSI-RS index in the measurement report ("option 1"). In some implementations, the CSI-RS index X is learned by the target cell from previous statistics ("option 2"). In some implementations, the target node may provide CSI-RS repetition configuration for a list of potential CSI-RS indices which the UE might use to perform random access. This would account for possible changes in the radio conditions between the activation of the repetition and the actual random access.

At 305, the source node sends a RRC reconfiguration message to the UE; this message includes the repetition configuration of the CSI-RS index X that is indicated by the target cell. In option 1, the repetition configuration is activated once the UE receives a DCI or MAC CE.

At 306, (option 1) the target node sends an activation message to the source cell including DCI or MAC CE to be sent for the UE.

At 307, (option 1) the UE sends a lower layer activation command (DCI or MAC CE generated by the source cell or the one received from target cell) to activate the repetition configuration.

At 308, (option 2) the repetition configuration is activated once a pre-configured radio frame (System Frame Number (SFN))/subframe/slot Y occurs.

At 309 and 310, the target node starts the CSI-RS repetition a short time after sending the activation message to the source cell and may repeat the CSI-RS repetition transmissions for some predefined time.

At 311, the UE determines the best receive beam Z for CSI-RS index X. The best beam Z for reception may be applied by the UE for transmission as well.

At 312, the UE sends a measurement report to the source node.

At 313, the source cell triggers and prepares the handover.

At 314, the source cell sends the RRC Reconfiguration (including HO command) to the UE.

At 315, the UE checks if the CSI-RS index X (or any of the CSI-RS indices for which repetition was configured) is valid to be used for random access. If L1-RSRP/L1-RSRQ/L1-SINR of CSI-RS index X (or any of the CSI-RS indices) is above a configured threshold Thr1, UE applies the narrow receive beam Z determined at 311. Otherwise, the UE applies the wide beam and performs random access as defined in current system.

At 316, the HO to the target cell is executed.

Figure 4:
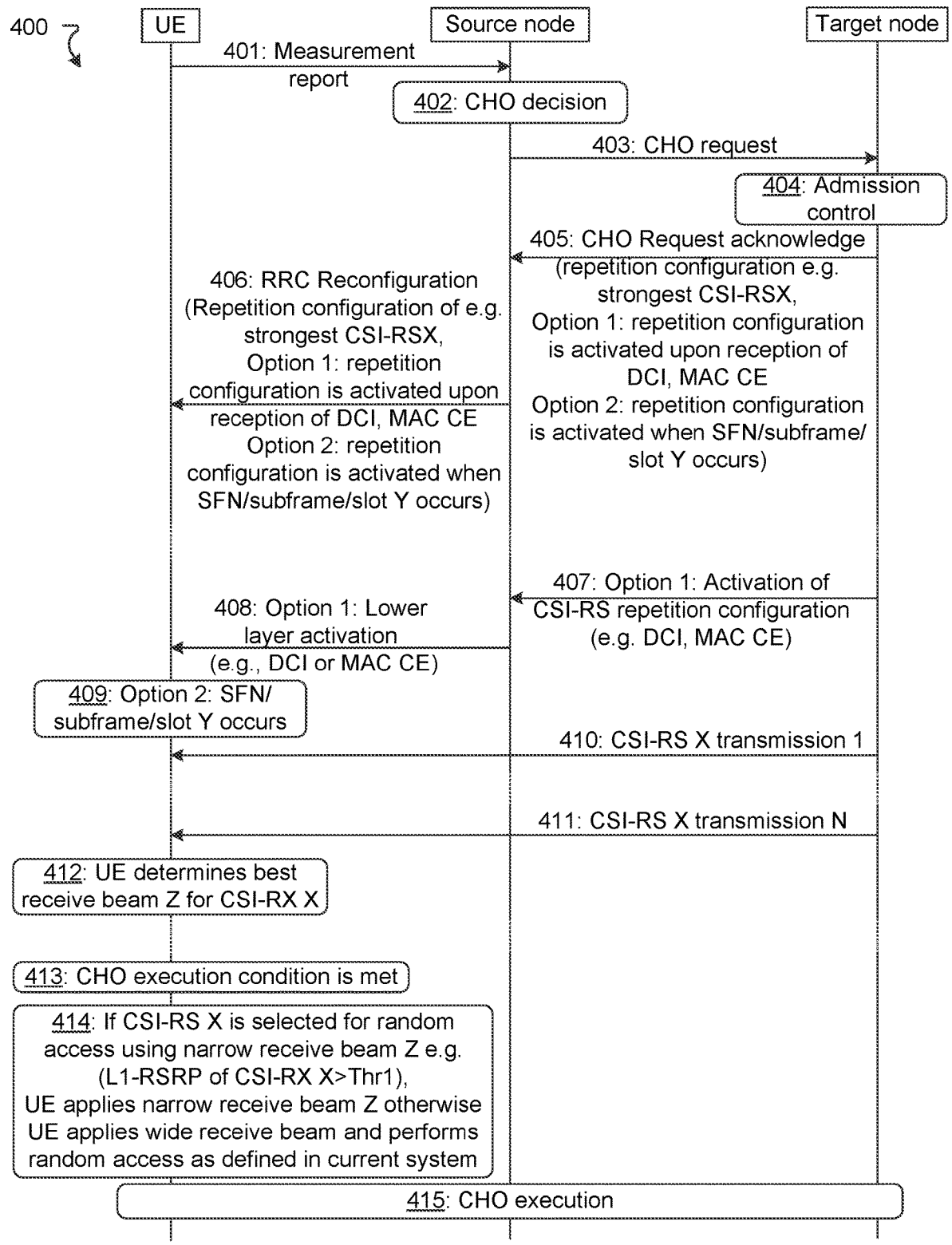
FIG. 4 is a sequence diagram illustrating a process of beam refinement before conditional handover, according to an example implementation.

FIG. 4 is a sequence diagram illustrating an example process of beam refinement before conditional handover (CHO).

At 401, a UE sends a measurement report to a source node of a wireless network. The measurement report indicates a candidate target cell for a CHO of a wireless connection within a wireless network.

At 402, based on the measurement report, the source node decides to perform a CHO to another candidate target cell.

At 403, the source node sends to the target node a request to prepare for a CHO.

At 404, the target node performs an admission control and decides to accept the CHO.

At 405, as a response for the request, the target node sends a CHO request acknowledgement including a CSI-RS repetition configuration to the source cell for the CSI-RS resource index ("index X") that the UE most likely would use for random access during the handover and whose transmission(s) is repeated while the UE is served by the source cell and before executing a handover. In some implementations, the CSI-RS index X is the strongest CSI-RS index in the measurement report ("option 1"). In some implementations, the CSI-RS index X is learned by the target cell from previous statistics ("option 2"). In some implementations, the target node may provide CSI-RS repetition configuration for a list of potential CSI-RS indices which the UE might use to perform random access. This would account for possible changes in the radio conditions between the activation of the repetition and the actual random access.

At 406, the source node sends a RRC reconfiguration message to the UE; this message includes the repetition configuration of the CSI-RS index X that is indicated by the target cell. In option 1, the repetition configuration is activated once the UE receives a DCI or MAC CE.

At 407, (option 1) the target node sends an activation message to the source cell including DCI or MAC CE to be sent for the UE.

At 408, (option 1) the UE sends a lower layer activation command (DCI or MAC CE generated by the source cell or the one received from target cell) to activate the repetition configuration.

At 409, (option 2) the repetition configuration is activated once a pre-configured radio frame (System Frame Number (SFN))/subframe/slot Y occurs.

At 410 and 411, the target node starts the CSI-RS repetition a short time after sending the activation message to the source cell and may repeat the CSI-RS repetition transmissions for some predefined time.

At 412, the UE determines the best receive beam Z for CSI-RS index X. The best beam Z for reception may be applied by the UE for transmission as well At 413, the CHO execution condition is met for the target cell and UE starts the CHO execution. In some implementations, if the UE performs CHO execution before the CSI-RS repetition is activated, the UE may fall back to a process in which UE beam refinement is performed during the HO.

At 414, the UE checks if the CSI-RS index X (or any of the CSI-RS indices for which repetition was configured) is valid to be used for random access. If L1-RSRP/L1-RSRQ/L1-SINR of CSI-RS index X (or any of the CSI-RS indices) is above a configured threshold Thr1, UE applies the narrow receive beam Z determined at 311. Otherwise, the UE applies the wide beam and performs random access as defined in current system.

At 415, the CHO execution to the target cell is completed.

Regarding FIGS. 3 and 4, in some implementations the CSI-RS repetition configuration may include the following:

- An indication to the UE that the transmission of selected target CSI-RS resource index will be repeated before HO execution. This can be implemented by using a flag/Boolean for enabling/or disabling the feature.
- An indication to the UE that the trigger and activation for this repetition is either a DCI, MAC CE that is sent via the source cell or an absolute radio frame/subframe/slot number.

The repetition configuration of the target CSI-RS resource index may further include:
- a. The type of transmission: Semi-persistent or aperiodic transmission
- b. Number of repetitions.
- c. Time/frequency information about CSI-RS allocation, i.e., slot/PRBs where to find the resource elements of CSI-RS resource.
- d. Offset between the slot containing the DCI that triggers a set of aperiodic/semi-persistent CSI-RS resource and the slot in which the CSI-RS resource set is actually transmitted.

In some implementations, the repetition configuration of CSI-RS used for random access is transmitted to the UE by the source cell.

In some implementations, the target cell repeats the transmission of CSI-RS X that is indicated by the target cell while the UE sweeps the receive beam. The UE determines the best receive/transmit beam.

In some implementations, the UE selects CSI-RS X and sends a CFRA PRACH preamble with a UE narrow beam (as it has already performed the UE beam alignment before the handover execution when CSI-RS repetition was activated) on a RACH occasion that is associated with CSI-RS X.

In some implementations, in a CU-DU architecture, the CU may communicate with the DU the repetition configuration of the CSI-RS resource index that will be selected and used by the UE for random access.

In some implementations, the handover procedure can be baseline handover procedure of NR Rel. 15, CHO, DAPS, Make-before break solution that is similar to LTE Rel. 14, or any combination of these handover techniques.

Figure 5:
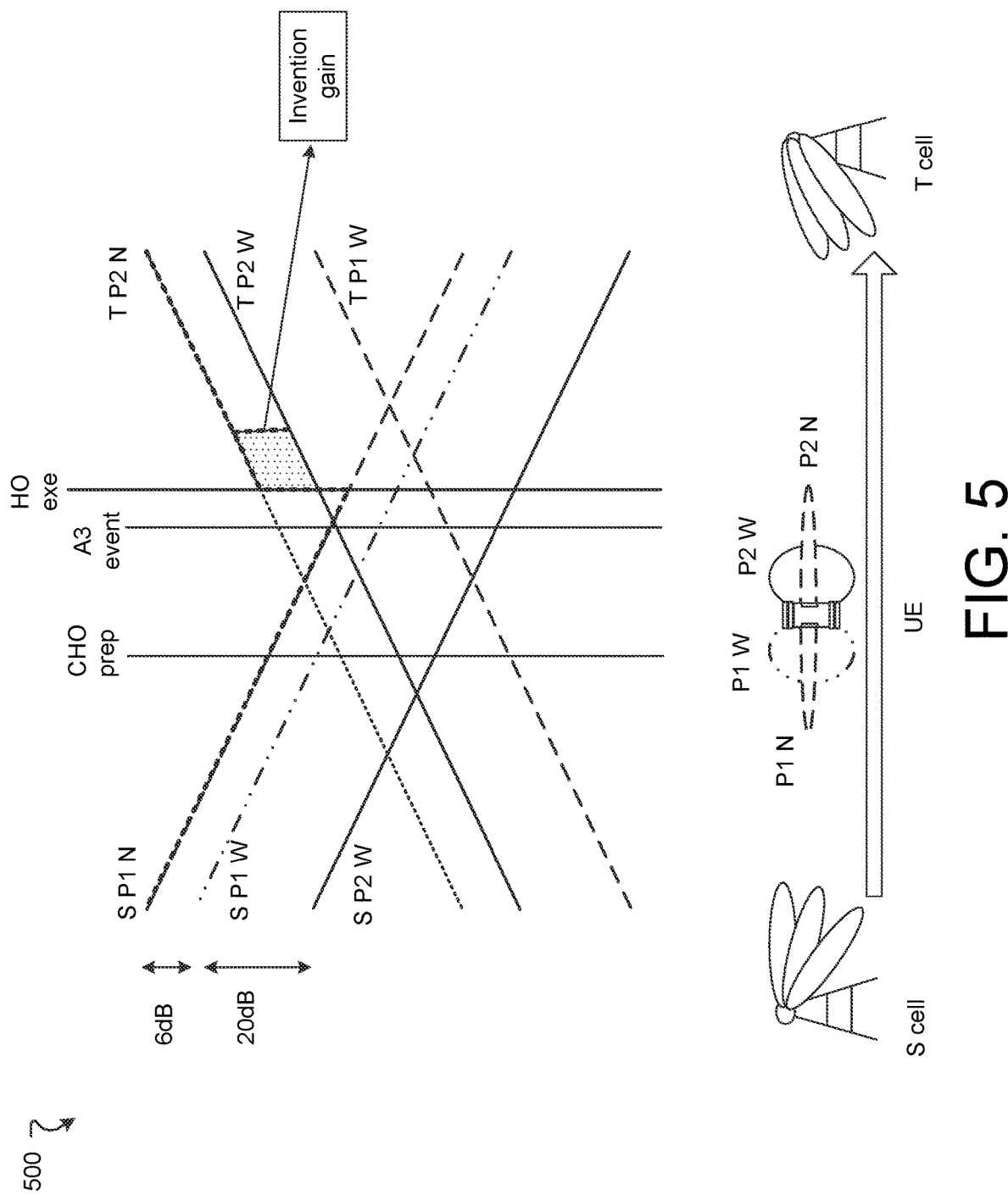
FIG. 5 is a diagram illustrating gain on a 2-panel user equipment (UE) performing a handover or conditional handover, according to an example implementation.

FIG. 5 is a diagram illustrating an example gain 500 on a 2-panel user equipment (UE) performing a handover or conditional handover. In FIG. 5, S represents a Serving cell, P1 represents Panel 1 at the UE, N represents narrow beam, W represents wide beam, T represents Target cell, and P2 represents Panel 2. Moreover, S P1 N represents Serving cell received at the UE with P1 configured with a narrow receive beam;

S P1 W represents Serving cell received at the UE with P1 configured with a wide receive beam;

S P2 W represents Serving cell received at the UE with P2 configured with a wide receive beam;

T P2 N represents Target cell received at the UE with P2 configured with a narrow receive beam;

and so on. The timing of CHO preparation ("CHO prep"), A3 event and HO execution ("HO exec"), is determined based on S P1 W curve crossing T P2 W curve. The dashed-solid represents the actual link budget of the UE. FIG. 5 shows the gain achieved by aligning the UE beam as early as possible when the handover is executed, instead of waiting for UE beam refinement procedure to be triggered by the target cell.

Figure 6:
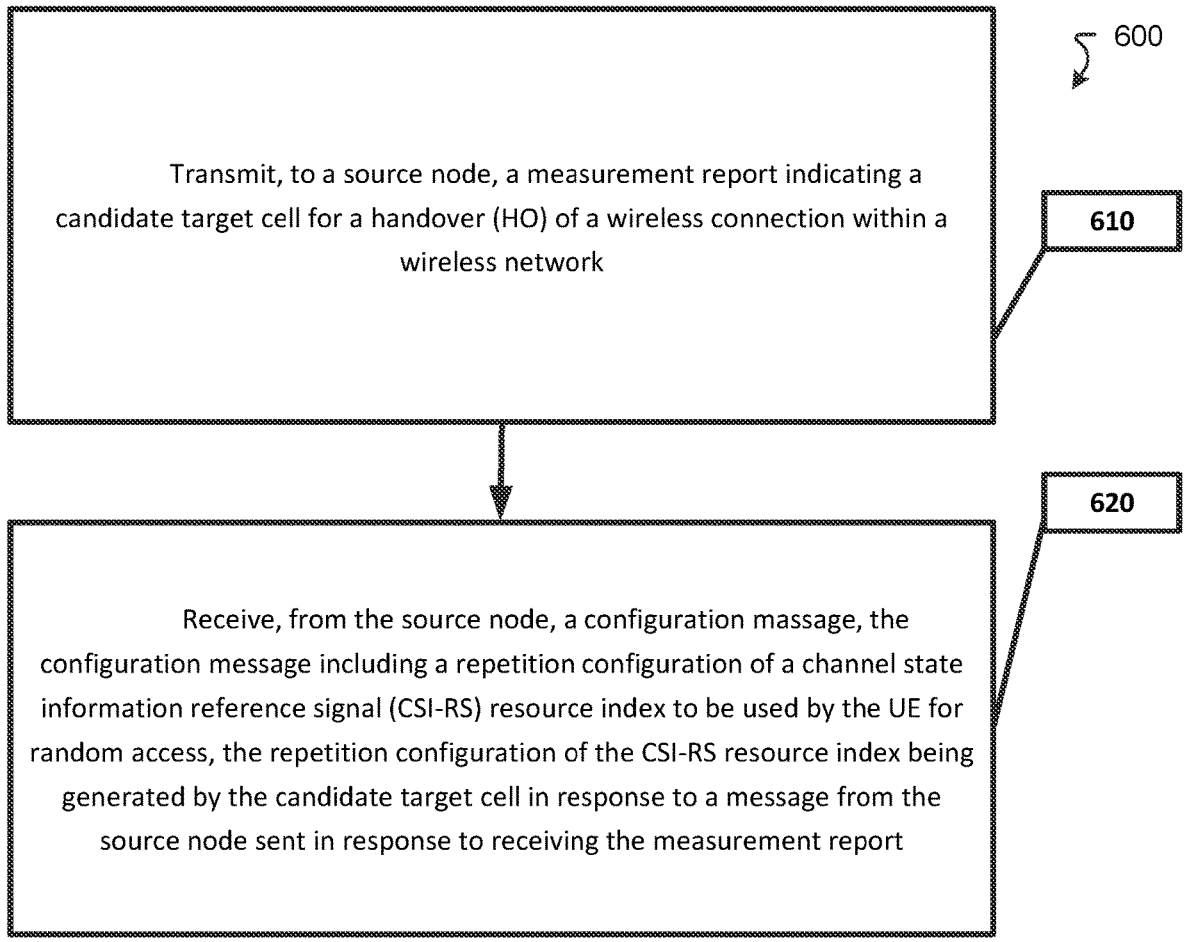
FIG. 6 is a flow chart illustrating a process of performing beam refinement before or during handover according to an example implementation.

Example 1-1: FIG. 6 is a flow chart illustrating an example method 600 of performing beam refinement before HO completion. Operation 610 includes transmitting, to a source node, a measurement report indicating a candidate target cell for a handover (HO) of a wireless connection within a wireless network. Operation 620 includes receiving, from the source node, a configuration message, the configuration message including a repetition configuration of a channel state information reference signal (CSI-RS) resource index to be used for random access, the repetition configuration of the CSI-RS resource index being generated by the candidate target cell in response to a message from the source node sent in response to receiving the measurement report.

Example 1-2: According to an example implementation of example 1-1, wherein the message is a HO request.

Example 1-3: According to an example implementation of example 1-2, wherein the configuration message further includes an indication to the UE that a transmission of the CSI-RS resource index to be selected and used by the UE in random access will be repeated.

Example 1-4: According to an example implementation of examples 1-2 or 1-3, wherein the configuration message further includes an indication to the UE that a repetition of the CSI-RS resource index is activated by a transmission from the target node or reception by the UE of a message indicating a successful completion of random access.

Example 1-5: According to an example implementation of example 1-4, wherein the random access is 4-step contention-free random access (CFRA); and wherein the message indicating the successful completion of the random access includes a random access channel (RACH) response.

Example 1-6: According to an example implementation of examples 1-4 or 1-5, wherein the random access is 2-step random access; and wherein the message indicating the successful completion of the random access includes a MsgB.

Example 1-7: According to an example implementation of any of examples 1-4 to 1-6, wherein the random access is 4-step contention-based random access (CBRA) or RACH-less; and wherein the message indicating the successful completion of the random access includes a physical downlink control channel (PDCCH) addressed by a cell radio network temporary identifier (C-RNTI) scheduling a physical downlink shared channel (PDSCH), the PDSCH being configured to include a UE contention resolution identifier.

Example 1-8: According to an example implementation of example 1-2, wherein the configuration message further includes an indication to the UE that a transmission of the CSI-RS resource index associated with a physical random access channel (PRACH) preamble and/or RACH occasion that is selected and used by the UE in the random access will be repeated.

Example 1-9: According to an example implementation of examples 1-2 or 1-8, wherein the repetition configuration of the CSI-RS resource index defines at least one of a type of transmission, a number of repetitions, time and/or frequency slots where resource elements of a CSI-RS resource are located, or an offset between a slot containing the DCI that triggers a set of aperiodic/semi-persistent CSI-RS resources and a slot in which a CSI-RS resource set is actually transmitted.

Example 1-10: According to an example implementation of any of examples 1-2, 1-8, or 1-9, wherein the HO request includes a conditional HO (CHO) request.

Example 1-11: An apparatus comprising means for performing a method of any of examples 1-1 to 1-10.

Example 1-12: A computer program product including a non-transitory computer-readable storage medium and storing executable code that, when executed by at least one data processing apparatus, is configured to cause the at least one data processing apparatus to perform a method of any of examples 1-1 to 1-10.

Figure 7:
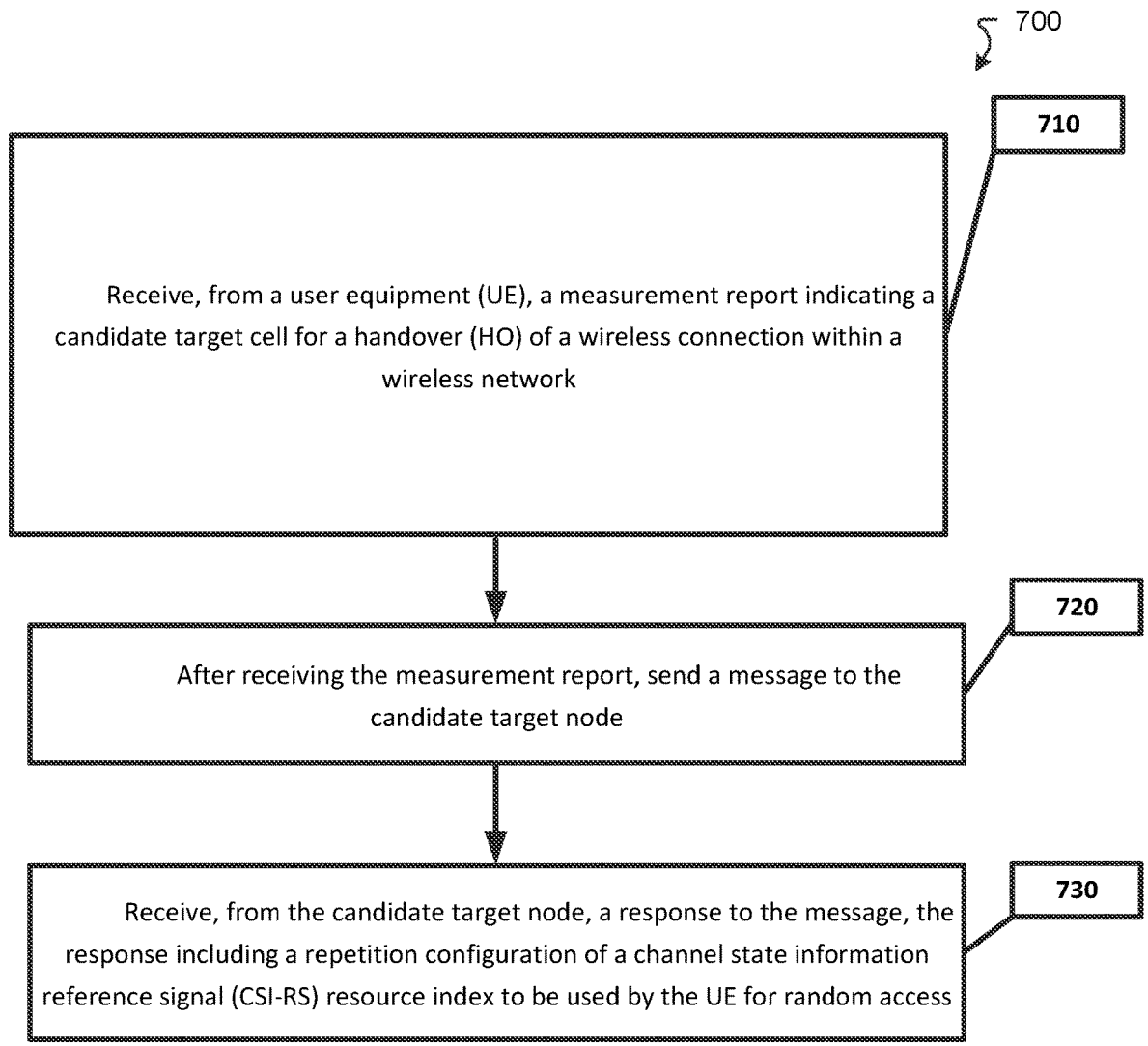
FIG. 7 is a flow chart illustrating a process of performing beam refinement before or during handover according to an example implementation.

Example 2-1: FIG. 7 is a flow chart illustrating a process 700 of performing beam refinement before HO completion. Operation 710 includes receiving, from a user equipment (UE), a measurement report indicating a candidate target cell for a handover (HO) of a wireless connection within a wireless network. Operation 720 includes, after receiving the measurement report, sending a message to the candidate target node. Operation 730 includes receiving, from the candidate target node, a response to the message, the response including a repetition configuration of a channel state information reference signal (CSI-RS) resource index to be used by the UE for random access.

Example 2-2: According to an example implementation of example 2-1, wherein the message is a CSI-RS repetition configuration request and the response is a CSI-RS repetition configuration response.

Example 2-3: According to an example implementation of example 2-2, wherein the at least one CSI-RS resource index is the strongest CSI-RS resource index or indices in the measurement report.

Example 2-4: According to an example implementation of examples 2-2 or 2-3, wherein the CSI-RS resource index is learned by the candidate target node based on previous statistics.

Example 2-5: According to an example implementation of example 2-1, wherein the repetition configuration is activated once the UE receives a downlink control information (DCI) or medium access control, control element (MAC CE).

Example 2-6: According to an example implementation of example 2-5, further including sending a configuration message to the UE; receiving a message from the candidate target cell indicating the CSI-RS repetition configuration is activated; and after receiving the message indicating the CSI-RS repetition configuration is activated, sending a command to the UE to activate the CSI-RS repetition configuration where the command can be one of a DCI or MAC CE.

Example 2-7: According to an example implementation of example 2-1, wherein the repetition configuration is activated once a pre-configured radio frame including at least one of a System Frame Number (SFN)), a subframe, or a slot occurs.

Example 2-8: According to an example implementation of example 2-1, wherein the HO is a conditional HO (CHO).

Example 2-9: According to an example implementation of example 2-8, wherein the repetition configuration is activated before the handover or CHO is executed or during execution of the handover or CHO.

Example 2-10: According to an example implementation of examples 2-8 or 2-9, wherein the repetition configuration includes an indication to the UE that a transmission of the CSI-RS resource index to be selected and used by the UE in random access will be repeated.

Example 2-11: According to an example implementation of any of examples 2-8 to 2-10, further including causing a split central unit (CU) to communicate the repetition configuration of the CSI-RS resource index to a distributed unit (DU).

Example 2-12: An apparatus comprising means for performing a method of any of examples 2-1 to 2-11.

Example 2-13: A computer program product including a non-transitory computer-readable storage medium and storing executable code that, when executed by at least one data processing apparatus, is configured to cause the at least one data processing apparatus to perform a method of any of examples 2-1 to 2-11.

LIST OF EXAMPLE ABBREVIATIONS

Figure 8:
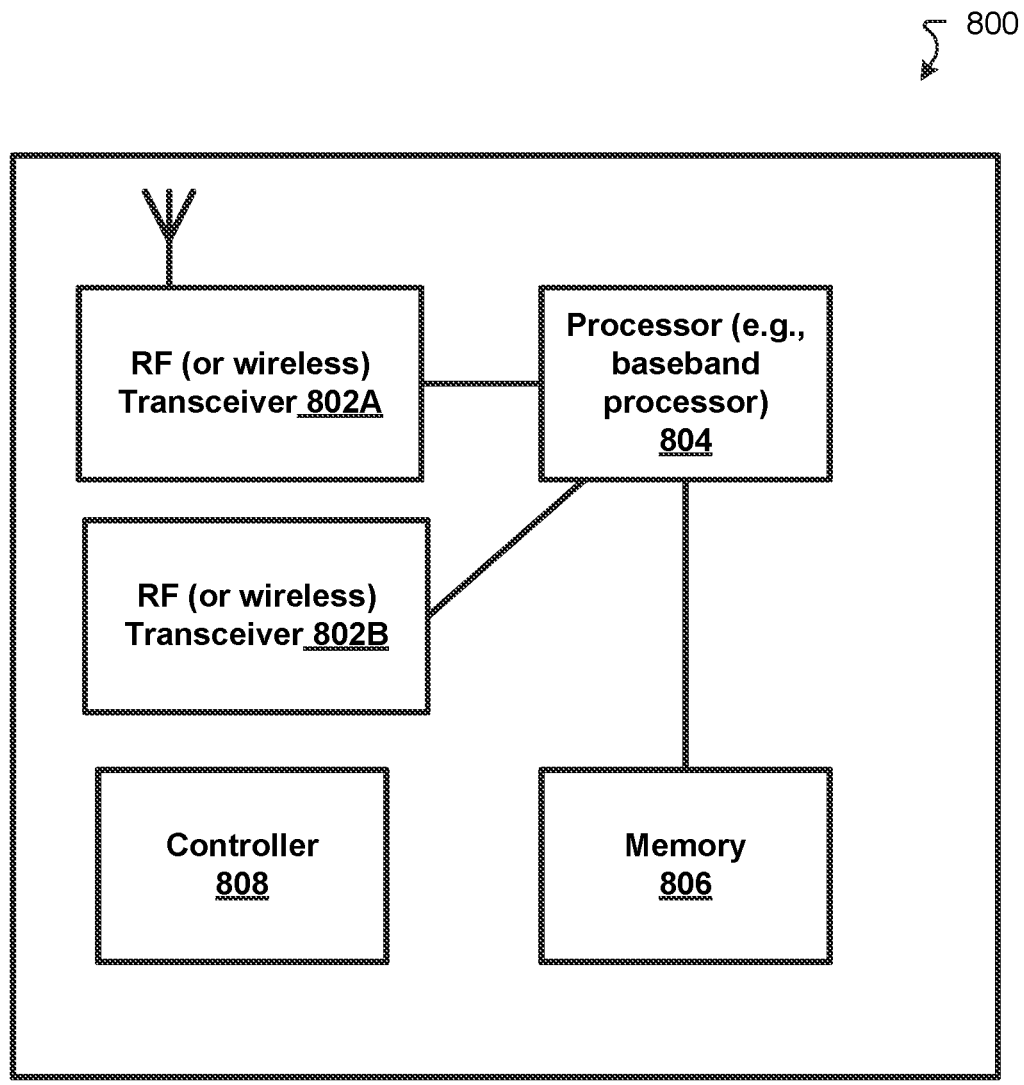
FIG. 8 is a block diagram of a node or wireless station (e.g., base station/access point, relay node, or mobile station/user device) according to an example implementation.

CBRA Contention Based Random Access
CFRA Contention Free Random Access
CHO Conditional Handover
C-RNTI Cell-Radio Network Temporary Identifier
CSI-RS Channel State Information-Reference Signal
DAPS Dual Active Protocol Stack
DL Downlink
HO Handover
PDCCH Physical Downlink Control Channel
PDCP Packet Data Convergence Protocol
RA Random Access
RAR RACH Response
RLC Radio Link Control
SDU Service Data Unit
SSB Synchronization Signal Block
UE User Equipment
UL Uplink FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. An apparatus, comprising:
at least one processor; and
at least one memory including computer program code;
the at least one memory and the computer program code configured to cause the apparatus at least to:
transmit, to a source node, a measurement report indicating a candidate target cell for a handover (HO) of a wireless connection within a wireless network;
receive, from the source node, a configuration message, the configuration message including a repetition configuration of a channel state information reference signal (CSI-RS) resource index to be used for random access to the candidate target cell, the repetition configuration of the CSI-RS resource index being associated with the candidate target cell and generated by the candidate target cell in response to a HO request from the source node sent in response to receiving the measurement report and indicating that transmission of the CSI-RS resource index will be repeated before execution of the handover, the repetition configuration defining whether a type of transmission is semi-persistent or aperiodic and further defining at least one of a number of repetitions, time and/or frequency slots where resource elements of a CSI-RS resource are located, or an offset between a slot containing a downlink control information (DCI) that triggers a set of aperiodic or semi-persistent CSI-RS resources and a slot in which a CSI-RS resource set is actually transmitted;
receive from the candidate target cell, repetitions of a CSI-RS corresponding to the CSI-RS resource index;
measure the received candidate target cell repetitions of the CSI-RS while sweeping a plurality of receive beams; and
select a best receive beam of the plurality of receive beams based on the measuring.

2. The apparatus as in claim 1, wherein the configuration message further includes an indication to the UE that a transmission of the CSI-RS resource index to be selected and used by the UE in random access will be repeated by the candidate target cell.

3. The apparatus as in claim 1, wherein the configuration message further includes an indication to the UE that a repetition of the CSI-RS resource index is activated by a transmission from the candidate target cell or reception by the UE of a message indicating a successful completion of random access.

4. The apparatus as in claim 3, wherein the random access is 4-step contention-free random access (CFRA); and
wherein the message indicating the successful completion of the random access includes a random access channel (RACH) response.

5. The apparatus as in claim 3, wherein the random access is 2-step random access; and
wherein the message indicating the successful completion of the random access includes a MsgB.

6. The apparatus as in claim 3, wherein the random access is 4-step contention-based random access (CBRA) or RACH-less; and
wherein the message indicating the successful completion of the random access includes a physical downlink control channel (PDCCH) addressed by a cell radio network temporary identifier (C-RNTI) scheduling a physical downlink shared channel (PDSCH), the PDSCH being configured to include a UE contention resolution identifier.

7. The apparatus as in claim 1, wherein the configuration message further includes an indication to the UE that a transmission of the CSI-RS resource index associated with a physical random access channel (PRACH) preamble and/or RACH occasion that is selected and used by the UE in the random access will be repeated by the candidate target cell.

8. The apparatus as in claim 1, wherein the HO request includes a conditional HO (CHO) request.

9. The apparatus as in claim 1, wherein the repetition configuration further defines time/frequency information about channel state information reference signal (CSI-RS) allocation.

10. A method, comprising:
transmitting, to a source node, a measurement report indicating a candidate target cell for a handover (HO) of a wireless connection within a wireless network;
receiving, from the source node, a configuration message, the configuration message including a repetition configuration of a channel state information reference signal (CSI-RS) resource index to be used for random access to the candidate target cell, the repetition configuration of the CSI-RS resource index being associated with the candidate target cell and generated by the candidate target cell in response to a HO request from the source node sent in response to receiving the measurement report and indicating that transmission of the CSI-RS resource index will be repeated before execution of the handover, the repetition configuration defining whether a type of transmission is semi-persistent or aperiodic and further defining at least one of a number of repetitions, time and/or frequency slots where resource elements of a CSI-RS resource are located, or an offset between a slot containing a downlink control information (DCI) that triggers a set of aperiodic or semi-persistent CSI-RS resources and a slot in which a CSI-RS resource set is actually transmitted;
receiving from the candidate target cell, repetitions of a CSI-RS corresponding to the CSI-RS resource index;
measuring the received candidate target cell repetitions of the CSI-RS while sweeping a plurality of receive beams; and
selecting a best receive beam of the plurality of receive beams based on the measuring.

11. A computer program product including a non-transitory computer-readable storage medium and storing executable code that, when executed by at least one data processing apparatus, is configured to cause the at least one data processing apparatus to perform a method of claim 10.

12. An apparatus comprising means for performing a method according to claim 10.

13. An apparatus, comprising:
at least one processor; and
at least one memory including computer program code;
the at least one memory and the computer program code configured to cause the apparatus at least to:

receive, from a user equipment (UE), a measurement report indicating a candidate target cell for a handover (HO) of a wireless connection within a wireless network;

after receiving the measurement report, send a HO request to a candidate target node serving the candidate target cell; and receive, from the candidate target node, a response to the HO request, the response including a repetition configuration of at least one channel state information reference signal (CSI-RS) resource index to be used by the UE for random access to the candidate target cell and indicating that transmission of the CSI-RS resource index will be repeated before execution of the handover, the repetition configuration defining whether a type of transmission is semi-persistent or aperiodic and further defining at least one of a number of repetitions, time and/or frequency slots where resource elements of a CSI-RS resource are located, or an offset between a slot containing a downlink control information (DCI) that triggers a set of aperiodic or semi-persistent CSI-RS resources and a slot in which a CSI-RS resource set is actually transmitted.

14. The apparatus as in claim 13, wherein the message is a CSI-RS repetition configuration request and the response is a CSI-RS repetition configuration response.

15. The apparatus as in claim 14, wherein the at least one CSI-RS resource index is the strongest CSI-RS resource index or indices in the measurement report.

16. The apparatus as in claim 14, wherein the at least one CSI-RS resource index is learned by the candidate target node based on previous statistics.

17. The apparatus as in claim 13, wherein the repetition configuration is activated once the UE receives a downlink control information (DCI) or medium access control, control element (MAC CE).

18. The apparatus as in claim 17, wherein the least one memory and the computer program code are further configured to cause the apparatus at least to:
send a configuration message to the UE;
receive a message from the candidate target cell indicating the CSI-RS repetition configuration is activated; and
after receiving the message indicating the CSI-RS repetition configuration is activated, sending a command to the UE to activate the CSI-RS repetition configuration where the command can be one of a DCI or MAC CE.

19. The apparatus as in claim 13, wherein the repetition configuration is activated once a pre-configured radio frame including at least one of a System Frame Number (SFN)), a subframe, or a slot occurs.

20. The apparatus as in claim 13, wherein the HO is a conditional HO (CHO).

21. The apparatus as in claim 20, wherein the repetition configuration is activated before the HO or CHO is executed or during execution of the HO or CHO.

22. The apparatus as in claim 20, wherein the repetition configuration includes an indication to the UE that a transmission of the CSI-RS resource index to be selected and used by the UE in random access will be repeated by the candidate target cell.

23. The apparatus as in claim 20, wherein the apparatus includes a split central unit (CU) and distributed unit (DU); and
wherein the least one memory and the computer program code are further configured to cause the apparatus at least to:
cause the CU to communicate the repetition configuration of the CSI-RS resource index to the DU.

24. A method, comprising:
receiving, from a user equipment (UE), a measurement report indicating a candidate target cell for a handover (HO) of a wireless connection within a wireless network;
after receiving the measurement report, sending a HO request to a candidate target node serving the candidate target cell; and
receiving, from the candidate target node, a response to the HO request, the response including a repetition configuration of a channel state information reference signal (CSI-RS) resource index to be used by the UE for random access to the candidate target cell and indicating that transmission of the CSI-RS resource index will be repeated before execution of the handover, the repetition configuration defining whether a type of transmission is semi-persistent or aperiodic and further defining at least one of a number of repetitions, time and/or frequency slots where resource elements of a CSI-RS resource are located, or an offset between a slot containing a downlink control information (DCI) that triggers a set of aperiodic or semi-persistent CSI-RS resources and a slot in which a CSI-RS resource set is actually transmitted.

* * * * *